United States Patent [19]

Han

[11] Patent Number: 5,541,780

[45] Date of Patent: Jul. 30, 1996

[54] SPECIAL-MODE LONG-PLAY VIDEO TAPE PLAYBACK WITH SKEW COMPENSATION RESPONSIVE TO COMPARISON OF HEAD OUTPUTS

[75] Inventor: Hong-gyu Han, Kyungki-do, Rep. of Korea

[73] Assignee: Samsung Electronics Co., Ltd., Suwon, Rep. of Korea

[21] Appl. No.: 329,001

[22] Filed: Oct. 25, 1994

[30] Foreign Application Priority Data

Nov. 30, 1993 [KR] Rep. of Korea .................... 93-25942

[51] Int. Cl.⁶ .................................................. H04N 5/78
[52] U.S. Cl. ........................ 360/10.2; 360/10.3; 360/61; 358/312
[58] Field of Search ............................ 360/10.1, 10.3, 360/61, 10.2, 36.1, 64; 358/338, 312

[56] References Cited

U.S. PATENT DOCUMENTS

4,445,145  4/1984  Moriya ........................... 360/10.2
4,623,940  11/1986  Matsumoto et al. ............. 360/10.3
5,245,482  9/1993  Sagawa et al. .................. 360/38.1

Primary Examiner—Andrew L. Sniezek

[57] ABSTRACT

Helical-scan video tape playback apparatus compensates for the skew generated during special reproduction operations (e.g., search functions) in the long-play mode. Video reproducing circuitry generates a first video signal; and a delay line supplies a second video signal in delayed response to the first video signal, the delay being one-half a horizontal scan line. During special reproduction operations in the long-play mode, a skew compensating device supplies an output video signal responsive to the first video signal when a first condition of a skew jump indication signal obtains and responsive to the second video signal when a second condition of the skew jump indication signal obtains. A frequency divider responds to an envelope comparison signal generated by comparing with a prescribed level the signals picked up by long-play heads and generates a square wave the fundamental frequency of which is half that of the envelope comparison signal. The prescribed level for such comparing can be furnished from signals picked up by standard-play heads.

14 Claims, 8 Drawing Sheets

SPECIAL-MODE LONG-PLAY VIDEO TAPE PLAYBACK WITH SKEW COMPENSATION RESPONSIVE TO COMPARISON OF HEAD OUTPUTS

BACKGROUND OF THE INVENTION

The present invention relates to a skew compensation device for use in helical-scan magnetic video tape playback or reproduction apparatus and the method of using that skew compensation device, and more particularly, to a device and a method for compensating for a skewing phenomenon generated when performing special reproduction operations, such as fast forward search, in a long-play (LP) mode.

Generally speaking, helical-scan magnetic video tape playback apparatus (for example, a videocassette player or a videocassette recorder/player) operating based on the NTSC system can utilize a standard-play (SP) mode, an LP mode and a super-long-play (SLP) mode, but helical-scan video tape playback apparatus operating based on the PAL system or the SECAM system can only utilize the SP and LP modes.

Figure 1A:
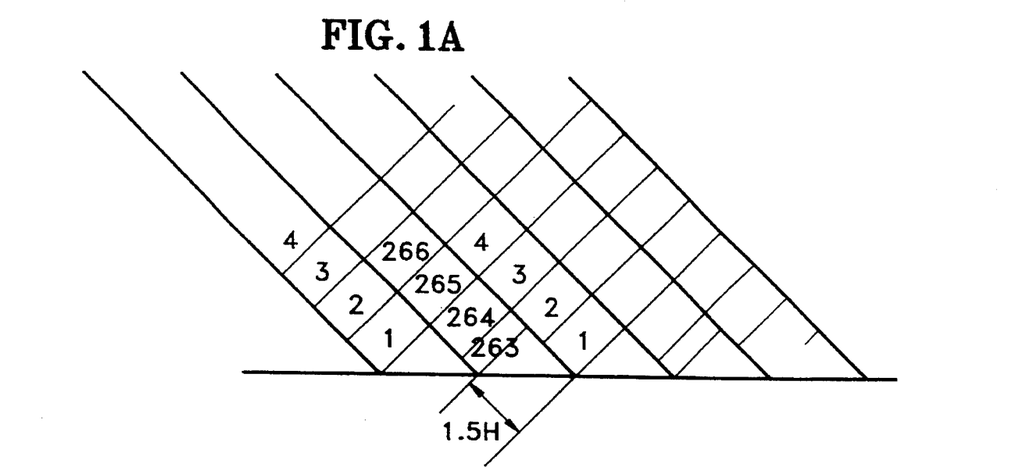
FIGS. 1A, 1B and 1C show various tape formats which are used in connection with SP, LP and SLP modes, respectively, both in the prior art and in the invention.
Figure 1B:
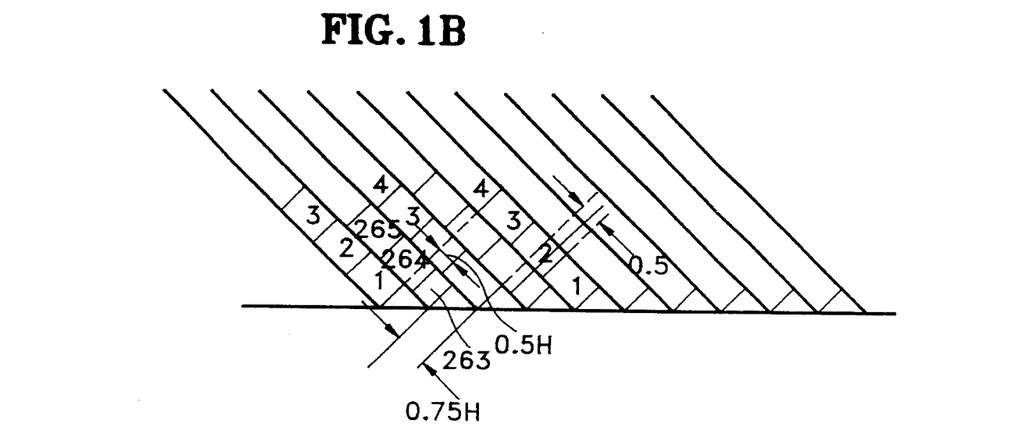
Figure 1C:
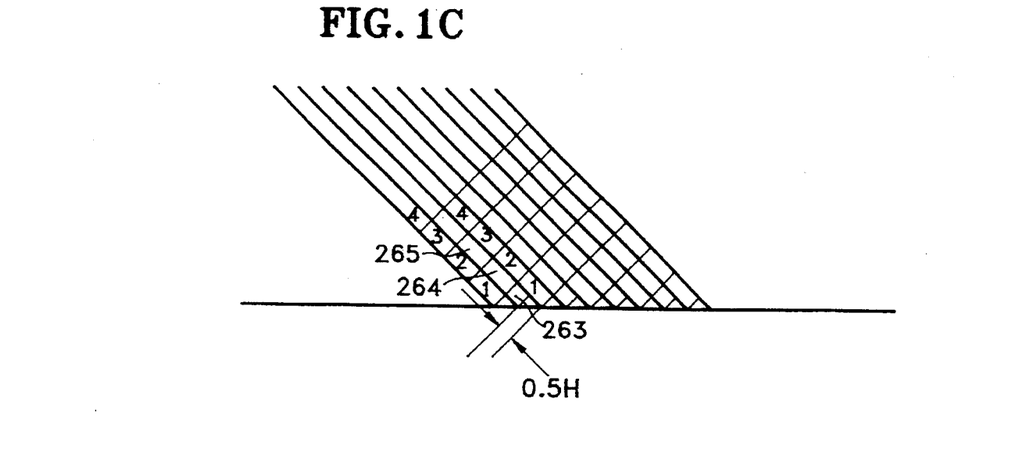

FIGS. 1A, 1B and 1C show the various tape formats used in connection with the above SP, LP and SLP modes, respectively. 1 H is the duration of a video scan line as recorded along a track on the video tape. FIGS. 1A and 1C illustrate the fact that an alignment of horizontal scan lines (or "H-alignment") on adjoining tracks results when recording in the SP mode or the SLP mode. Horizontal scan lines exhibit similar spatial phasing on parallel recording tracks, both adjoining ones and alternate ones. FIG. 1B illustrates the fact that horizontal scan lines exhibit staggered spatial phasing along adjoining tracks and along alternate tracks when recording in the LP mode. Horizontal scan lines exhibit similar spatial phasing only every fourth one of parallel recording tracks when recording in the LP mode, as illustrated in FIG. 1B. Accordingly, no skewing phenomenon associated with irregularity in horizontal scan line phasing from one recording track to the next is encountered in the SP or SLP mode special reproducing functions, such as rapid search. However, the skewing phenomenon manifests itself in the LP mode special reproducing functions, such as rapid search or quick find, since horizontal scan line phasing varies between recording tracks by as much as 0.5 H. A device for compensating for this skewing is called a "skew jump device" or "skew compensation device".

In other words, based on the tape format shown in FIG. 1B, when a search operation is performed in the LP mode with two long-play heads, so that each head jumps a closest-by track the azimuth of which differs from that of the current track and then performs a reproducing operation on the next-to-closest-by track, which presumably has the same azimuth, a 0.5 H delay mismatch generally occurs and the reproduced image is distorted accordingly. Therefore, a skew compensation device is required for compensating for such a delay mismatch in the tracking.

Figure 2:
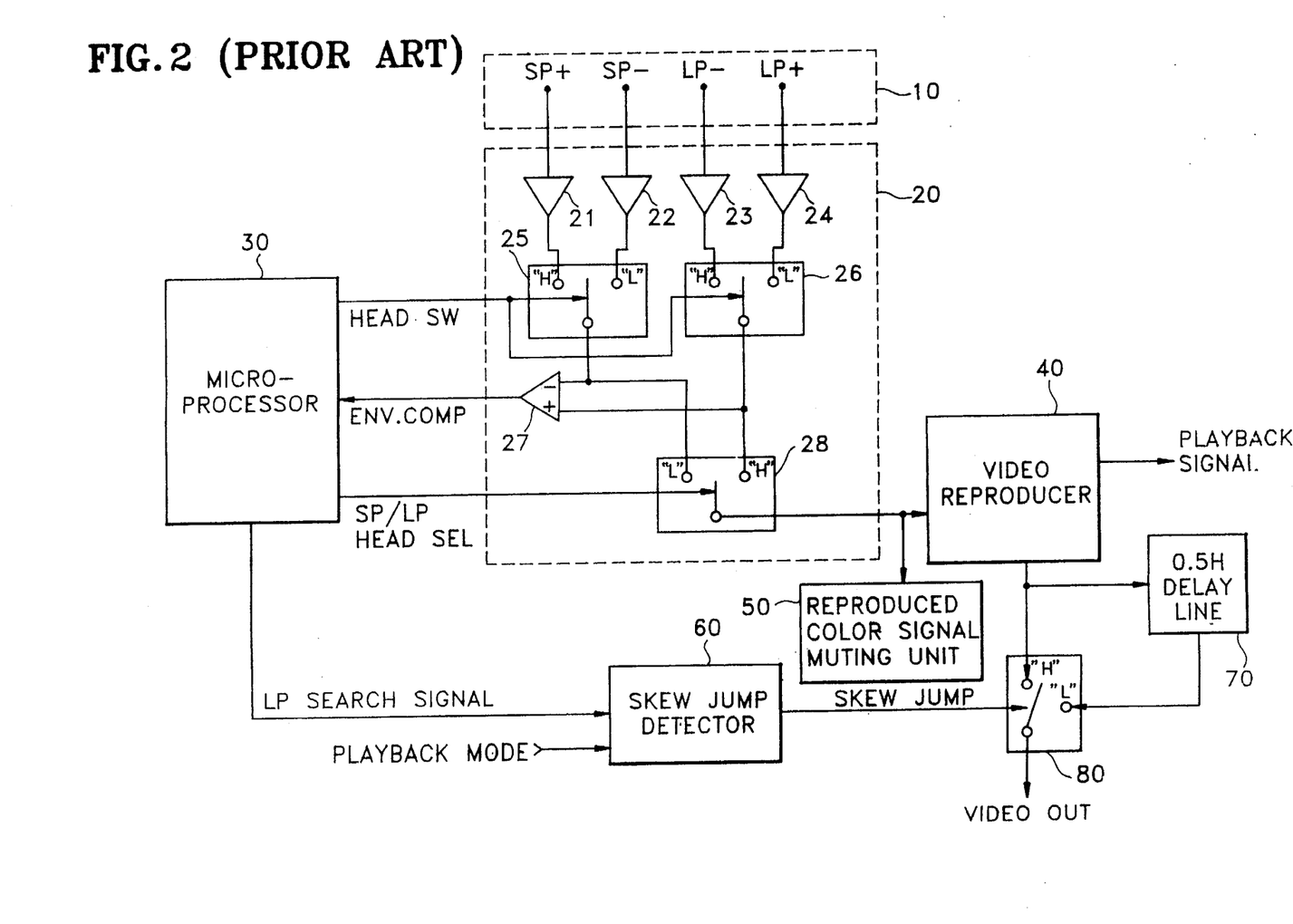
FIG. 2 is a circuit diagram of a conventional skew compensation device using a skew jump detector.

The circuit diagram of a conventional skew compensation device including skew jump detector 60 for generating a skew jump indication signal, a 0.5 H delay line 70, and an output video signal selection switch 80 is shown in FIG. 2, together with other apparatus used during special reproducing functions, such as rapid search. Four head signals (SP+, SP−, LP+ and LP−) are picked up by a head unit 10. A preamplifier 20 preamplifies these head signals in preamplifiers 21, 22, 23 and 24, respectively. In response to a head switching signal and a SP/LP head selection signal supplied thereto from a microprocessor 30, the preamplifier 20 selects the response of one of the preamplifiers 21, 22, 23 and 24 as its output signal supplied to a video reproducer 40 as its input signal.

The microprocessor 30 generates the head switching signal in accordance with control pulses derived from a crystal oscillator in chroma reproduction circuitry. The microprocessor 30 generates the SP/LP head selection signal in accordance with an envelope comparison signal supplied from the preamplifier 20 and playback mode indications as to whether the video tape being played back was recorded in SP, LP or SLP mode and as to whether playback is at normal-reproduction tape speed or at special-reproduction tape speed. The playback mode indications can comprise a normal/special signal supplied in response to user control, which indicates whether playback is at the speed associated with normal reproduction or at a multiple of that speed associated with special reproduction, and tape speed indications of whether the video tape being played back was recorded in SP, LP or SLP mode supplied from automatic speed selection circuitry. Where the automatic speed selection function is performed within the microprocessor, rather than in automatic speed selection circuitry completely external to the microprocessor, the microprocessor is supplied pulses that a control head senses from the control track on the video tape.

In a PAL and SECAM type of videocassette recorder, a color phase error occurs when in the LP mode, so that proper color representation is not made; i.e., an erroneous color is represented on a television monitor. In a PAL-type system, the phases of a burst signal and a color carrier signal are inverted every 1 H period. In the a SECAM-type system, the R-Y and B-Y color signals are frequency-modulated by 4.4 MHz and 4.25 MHz, respectively, and the carrier signal of a chroma FM signal is switched between 4.25 MHz and 4.4 MHz every other 1 H period, so color representation is not stably performed in the LP search mode. Therefore, a reproduced color signal muting unit 50 is customarily used to mute or "kill" the PAL-type or SECAM-type color signals, to avoid presenting an erroneous color image. However, in an NTSC type of videocassette recorder, there is no switching of color subcarrier phasing between lines, so the reproduced color signal muting unit 50 is not used and the output signal of the preamplifier 20 is supplied to the video reproducer 40 without muting the color signal. Instead, a color signal compensating unit for compensating for a phase error generated during the LP mode, can be provided at the output of the video reproducer 40.

Figure 3:
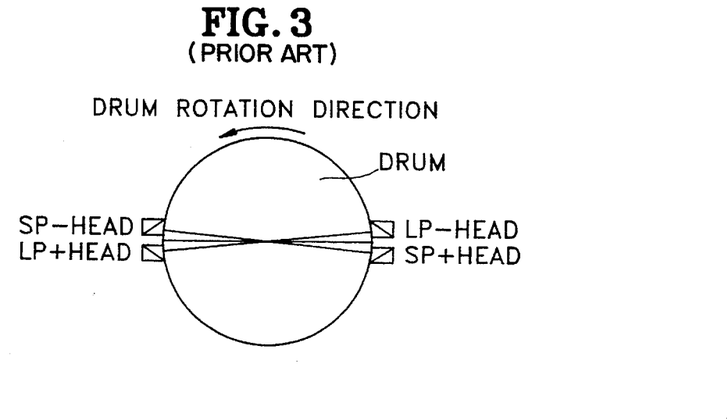
FIG. 3 is a view showing four heads provided on a drum, as used both in the prior art and in the invention.

FIG. 3 is a position map of the four heads situated on a drum in the head unit of a helical tape recorder. When special reproducing functions are performed in the SP mode, all four heads are utilized. However, when special reproducing functions are performed in the LP mode or in the SLP mode, only two heads (those supplying the LP+ and LP− head signals) are utilized. Referring to FIG. 2, four head signals (SP+, SP−, LP+ and LP−) are induced in respective windings of the heads and the preamplifier 20 supplies preamplified response to one of them as the input signal for the video reproducer 40.

Figure 4A:
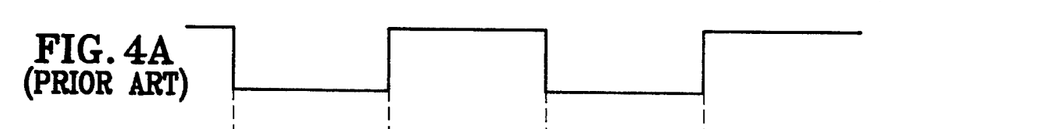
FIGS. 4A–4F are waveforms of input/output control signals in the preamplifier shown in FIG. 2.

First, the operation of the preamplifier 20 when triple-speed searching in the SP mode will be explained. Head selection is made in accordance with the head switching signal (HEAD SW) which is shown in FIG. 4A. When the head switching signal is at a logic "low" level, first and second head selecting switches 25 and 26 select the signals which are picked up by the SP− head and LP+ head and transferred through second and fourth amplifiers 22 and 24.

When the head switching signal is at a logic "high" level, the first and second head selecting switches 25 and 26 select the signals which are picked up by the SP+ head and LP– head and transferred through first and third amplifiers 21 and 23.

Figure 4B:
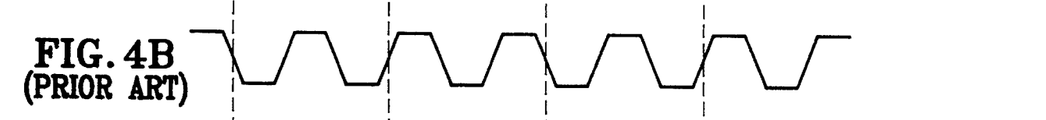

In an envelope comparator 27, a comparison is made between the SP– head signal and the LP+ head signal or between the SP+ head signal and the LP– head signal, according to the selection made by the first and second head selecting switches 25 and 26. The envelope comparator 27 includes envelope detectors for each of its input signals, means for differentially combining the detection results, and means for determining the polarity of the result of differentially combining to generate the envelope comparison signal. If the LP head signal (LP– or LP+) is larger than the SP head signal (SP– or SP+), the envelope comparator 27 supplies a logic "high" level of envelope comparison signal (ENV. COMP) to the microprocessor 30. If the LP head signal is smaller than the SP head signal, the envelope comparator 27 supplies a logic "low" level of envelope comparison signal to the microprocessor 30. The envelope comparison signal output from the envelope comparator 27 is shown in FIG. 4B.

Figure 4C:
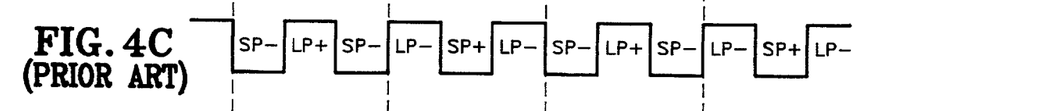

The microprocessor 30 performs pulse shaping on that envelope comparison signal to produce a signal shown in FIG. 4C for controlling a head amplifier switch 28 that selects either the LP head signal or the SP head signal as the preamplifier 20 output signal. In other words, when the SP/LP head selection signal produced from the microprocessor 30 is "high", the head amplifier switch 28 selects the LP head signal output from second head selecting switch 26 as the preamplifier 20 output signal; and when the SP/LP head selection signal is "low", the head amplifier switch 28 selects the SP head signal output from the first head selecting switch 25 as the preamplifier 20 output signal. The preamplifier 20 output signal so selected is supplied to the video reproducer 40 as its input signal.

Figure 4D:
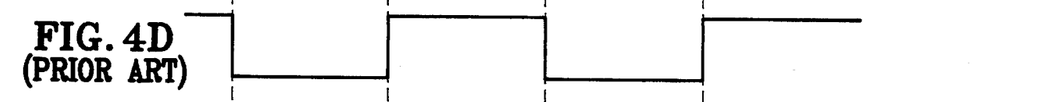
Figure 4E:
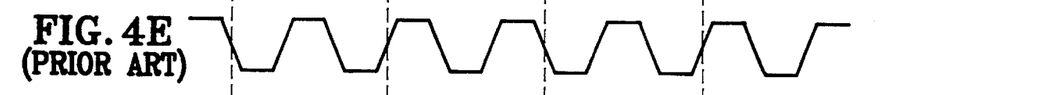
Figure 4F:
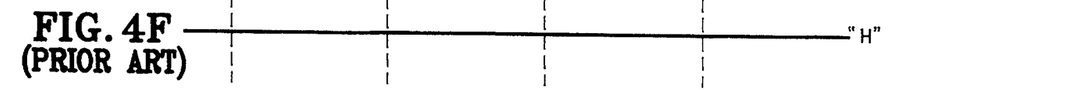

Now, the operation of the preamplifier 20 when triple-speed searching in the LP mode or in the SLP mode will be explained. In these search modes, the head switching signal supplied from the microprocessor 30 to the head selecting switches 25 and 26 is as shown in FIG. 4D, and the envelope comparison signal that the envelope comparator 27 supplies to the microprocessor 30 is as shown in FIG. 4E. In the LP and SLP modes, searching is made using heads LP– and LP+, so the SP/LP head selection signal output from the microprocessor 30 is always high, and the head amplifier switch 28 selects only the signals picked up by LP– and LP+ heads and transferred through the second head selecting switch 26 in accordance with the SP/LP head selection signal. The signal selected by the head amplifier switch 28 is reproduced by the video reproducer 40.

The operation of the FIG. 2 skew compensation device comprising the skew jump detector 60, the 0.5 H delay line 70, and the output video signal selection switch 80 will now be described. When special reproduction is performed in the SP mode or in the SLP mode, in which modes skew generation does not manifest itself, the skew jump detector 60 is conditioned to be inoperative. The control signal supplied to the switch 80 is in a "high" state, conditioning the switch 80 to select the undelayed output signal of the video reproducer 40 as a selected video output signal. When special reproduction is performed in the LP mode now the switch 80 responds to a skew jump indication signal (SKEW JUMP) output from the skew jump detector 60 for selecting either the undelayed output signal of the video reproducer 40 or that output as delayed one-half scan line by the delay line 70, to produce a selected video output signal.

While the first and second head selecting switches 25 and 26, the head amplifier switch 28 and the output video signal selection switch 80 are shown as simple single-pole/double-throw switches those familiar with the art of video recording will appreciate that each of these switches is an electrically controlled electronic switch, as can be constructed in a variety of known ways recognized by those skilled in the art as essentially being equivalents. Head switching can be done by alternately powering the preamplifiers 21, 22 and by alternately powering the preamplifiers 23, 24, for example.

The operation of the FIG. 2 skew compensation device is more particularly described with reference to the more detailed FIG. 5, in which diodes D1 and D2 provide the means for selectively conditioning the skew jump detector 60 to be operative to selectively switch the switch 80 in the LP mode, but not in the SP or SLP modes. As long as the diode D1 remains reverse-biased for non-conduction, the switch 80 responds to a skew jump indication signal (SKEW JUMP) supplied from the skew jump detector 60 via the forward-biased diode D2, for selecting either the undelayed output signal of the video reproducer 40 or that output as delayed one-half scan line by the delay line 70, to produce a selected video output signal. The SKEW JUMP signal is supplied from the skew jump detector 60 to the switch 80 via the diode D2 only as long as it remains forward-biased for conduction, which the diode D2 does as long as diode D1 remains reverse-biased for non-conduction. A pull-down resistor (not shown in FIG. 5) connected from the interconnected cathodes of the diodes D1 and D2 to a point of "low" potential will aid in maintaining the desired bias conditions on the diodes D1 and D2.

When special reproduction is performed in the SP mode or in the SLP mode, in which modes skew generation does not manifest itself, the LP search signal is "high". This forward-biases the diode D1 for conduction and thereby applies a "high" level of control signal to control switch 80, conditioning the control switch 80 to select the undelayed reproduced signal of the video reproducer 40 as the selected video output signal. The diode D2 is reverse-biased for non-conduction during the times the skew jump indication signal is in a "low" state, so the skew jump indication signal being in a "low" state cannot condition the control switch 80 to select the delayed reproduced signal of the video reproducer 40 from the delay line 70 as the selected video output signal.

When special reproduction is performed in the LP mode, the LP search signal is "low", so the diode D1 is not forward-biased into conduction. Accordingly, the skew jump indication signal can forward-bias the diode D2 into conduction when it is in a "high" state. If the skew jump indication signal is in a "high" state, the output signal of the video reproducer 40 is selected as the selected output signal; and if the skew jump indication signal is in a "low" state, the output signal of the video reproducer 40 as delayed by one-half scan line by the 0.5 H delay line 70 is selected as the selected video output signal.

Figure 5:
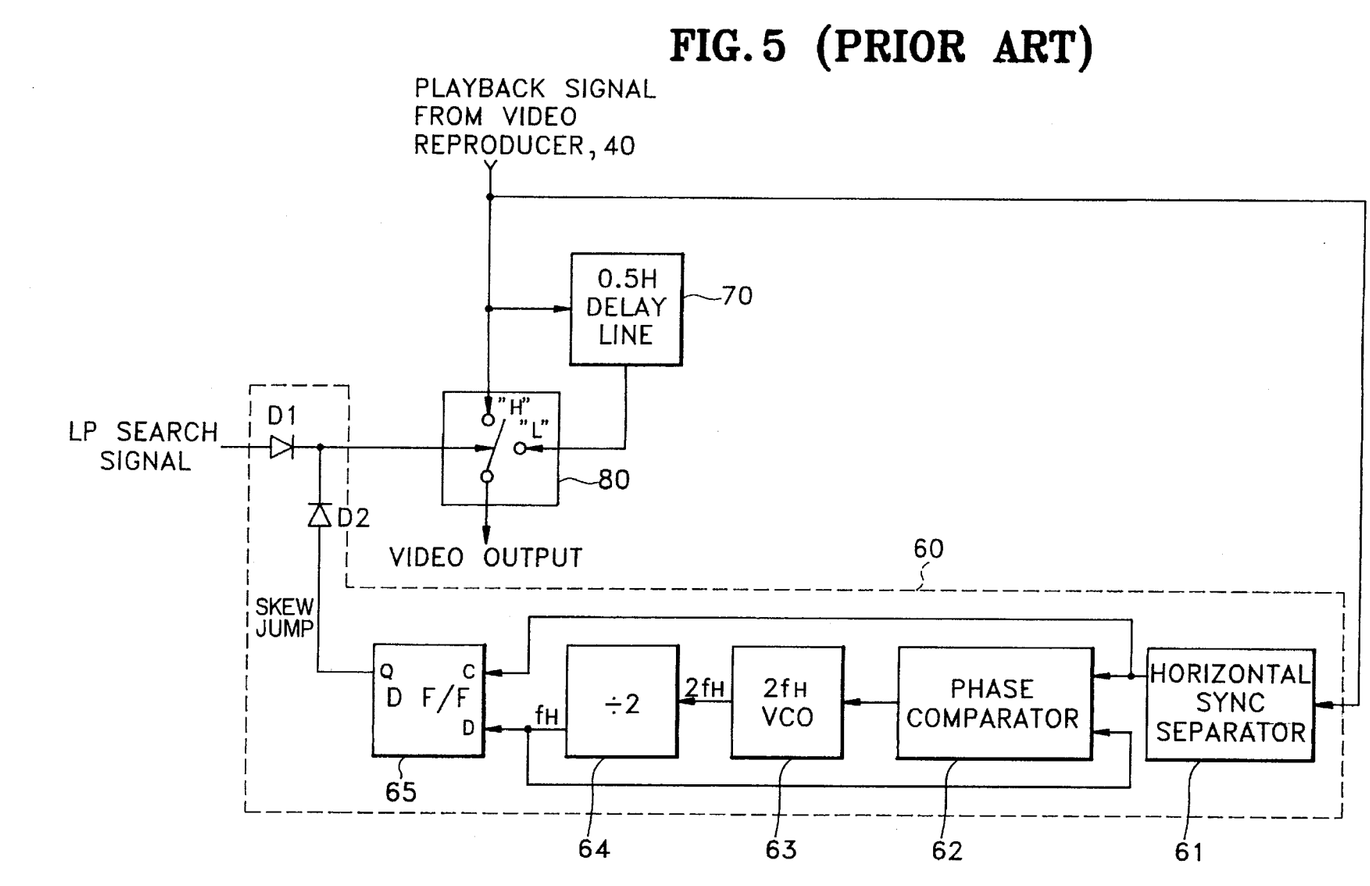
FIG. 5 is a detailed circuit diagram of the skew jump detector shown in FIG. 2 and known in the prior art.
Figure 6A:
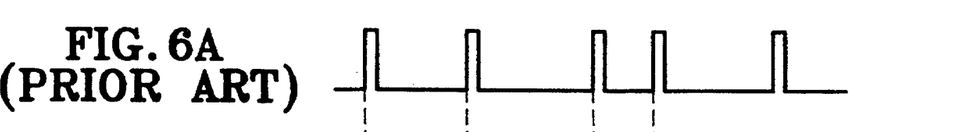
FIGS. 6A–6D are waveforms of the skew jump detector shown in FIG. 5.
Figure 6B:
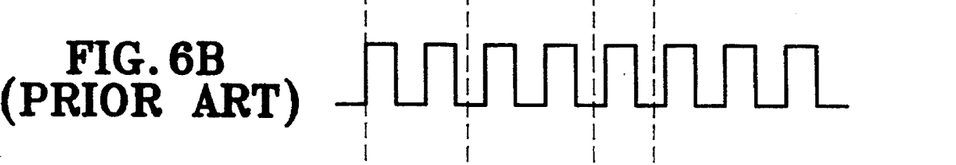
Figure 6C:
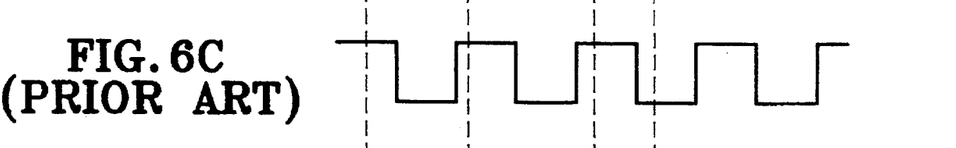

FIG. 5 shows the skew jump detector 60 in greater detail than FIG. 2 as comprising the diodes D1 and D2, a sync signal separator 61, a phase comparator 62, a voltage-controlled oscillator 63, a frequency divider 64, and a data or D flip-flop 65. The sync signal separator 61 separates a horizontal sync signal per FIG. 6A from the video signal produced by the video reproducer 40 of FIG. 2. The phase comparator 62 compares the phase of the horizontal sync signal separated by the horizontal sync separator 61 with that of the output signal of the frequency divider 64. The voltage-controlled oscillator 63 receives a phase difference signal from the phase comparator 62 as an automatic frequency and phase control voltage, which regulates the oscillation of the voltage-controlled oscillator 63 so that it oscillates at the frequency corresponding to $2f_H$ thus producing a signal as shown in FIG. 6B. The frequency divider 64 halves the frequency of the output signal of voltage-controlled oscillator 63, to produce a signal as shown in FIG. 6C. The output signal of the frequency divider 64 will be referred to as horizontal scanning frequency signal $f_H$ in the remainder of this disclosure.

Figure 6D:
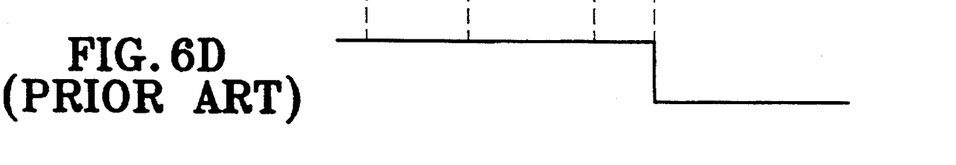

The D flip-flop 65 receives the signal output from the frequency divider 64 and receives the horizontal sync signal output from the horizontal sync separator 61 as a clock signal, to sense the portion in which a skew occurs and to produce the skew jump indication signal as shown in FIG. 6D. In the case where horizontal scanning frequency signal (shown in FIG. 6C) is high when horizontal sync signal (shown in FIG. 6A) is high, a skew jump indication signal having a "high" level is produced by the data flip-flop 65. When the diode D2 is forward-biased for conduction, during the LP mode, the switch 80 responds to the "high" level of skew jump indication signal to select the original video signal output from the video reproducer 40 as its selected output video signal. On the other hand, in the case where the horizontal scanning frequency signal (shown in FIG. 6C) is low when the horizontal sync signal (shown in FIG. 6A) is high, which case corresponds to when 0.5 H skew jump occurs, the skew jump indication signal (shown in FIG. 6D) should switch from "high" to "low" state. If such is the case, during the LP mode when the diode D2 is forward-biased for conduction, switch 80 responds to the "low" level of skew jump indication signal to select the 0.5 H delayed video signal output from the 0.5 H delay line 70 as its selected output video signal.

The phase of horizontal scanning frequency signal $f_H$ from the frequency divider 64 is very important for properly sensing when skew jumps occur, so the phasing thereof must be precisely controlled. If the phase slips from proper phasing, a skew jump erroneously occurs, wrecking the image recovered from the selected video output signal provided by the switch 80. Since the automatic frequency and phase control voltage of the voltage-controlled oscillator 63 is generated in response to horizontal sync signal reproduced from the video tape and separated by the horizontal sync separator 61, there is a problem with the phase of the horizontal scanning frequency signal $f_H$ accurately tracking the effects of variations in tape motion past the reproducing heads on the constancy of the phasing of the separated horizontal sync pulses. Inaccurate tracking has adverse affects on the image because the erroneous occurrences of skew jump are more frequent. Also, a separate circuit as that shown in FIG. 5 for generating a skew jump indication signal complicates the circuit configuration unduly, the inventor has discerned.

In U.S. Pat. No. 5,245,482 issued 14 Sep. 1993 and entitled Magnetic Recording/Reproducing Apparatus with Skew Correction, Sagawa et alii describe an alternative device for compensating a video signal skew generated when scanning a magnetic tape using a plurality of heads in a magnetic recording/reproducing apparatus such as video-cassette recorder. This device performs a head switching during vertical blanking period and includes circuitry to prevent jitter in a reproduced video image causing a skew jump to occur during head switching. However, this prior-art device also requires a separate circuit for compensating for skewing, which has an additional cost associated therewith.

SUMMARY OF THE INVENTION

A method of playing back from a magnetic tape that embodies an aspect of the invention obtains a reproduced video signal from a recording made on a magnetic video tape with a predetermined helical-scan pattern. The method is practiced using a tape transport operable at normal and faster-than-normal reproduction speeds. The transport is provided with a head drum having diametrically opposed first and second heads mounted on its rim, which first and second heads have respective windings. The magnetic tape is transported at said faster than normal reproduction speed past the head drum, which is rotated at a prescribed speed. This induces signals in the respective windings of the first and second heads, which are preamplified to generate first and second pre-amplified signals alternately selected from to supply a selected pre-amplified signal. A first video signal is reproduced from the selected pre-amplified signal and is delayed by the time duration of substantially one half a horizontal scan line to generate a second video signal. The envelope of the selected pre-amplified signal is compared to a prescribed level, for generating an envelope comparison signal having a fundamental frequency. The envelope comparison signal is frequency-divided for generating a skew jump indication signal that alternates between first and second conditions, the skew jump indication signal being essentially a square-wave having half the fundamental frequency of the envelope comparison signal. The first video signal is selected as the reproduced video signal responsive to the first condition of the skew jump indication signal; and the second video signal is selected as the reproduced video signal responsive to the second condition of the skew jump indication signal. Where the head drum of tape transport has diametrically opposed third and fourth heads also mounted on its said rim, which third and fourth heads have respective windings, the prescribed level to which the envelope of the selected pre-amplified signal is compared for generating an envelope comparison signal can be generated as follows. The signals induced in the respective windings of the third and fourth heads are preamplified to generate third and fourth pre-amplified signals, which are alternately selected for supplying that prescribed level.

Aspects of the invention relating to apparatus improvements concern helical-scan video tape playback apparatus operable in a standard-play mode, both at normal-reproduction and special-reproduction speeds, and operable in a long-play mode, both at normal-reproduction and special-reproduction speeds. Such video tape playback apparatus includes a pair of standard-play heads and a pair of long-play heads mounted on a head drum thereof; preamplifier circuitry, for preamplifying respective pickup signals from each of those heads, and for selecting as a preamplifier output signal one of respective preamplified pickup signals thereby resulting; video reproducing circuitry for generating a first video signal in response to the preamplifier output signal; a delay line for supplying a second video signal in delayed response to the first video signal; circuitry for generating a skew jump indication signal having first or second condition, responsive to the passage of one of the pair of long play heads over alternate recording tracks during special reproduction from video tape recorded in the long play mode; and a skew compensating device for supplying a third video signal, which is responsive to the first video signal when the first condition of the skew jump indication signal obtains, and which is responsive to the second video signal when the second condition of the skew jump indication signal obtains. Skewing which appears in the first and second video signals in response to scanning across alternate recording tracks with staggered horizontal scan lines therein is accordingly compensated for in the third video signal. An aspect of the invention concerns improving the video tape playback apparatus by providing a simpler means for generating the skew jump indication signal. A comparator compares the envelope of a selected one of the respective preamplified pickup signals from the pair of long-play heads with a prescribed level for generating an envelope comparison signal; and a frequency divider responds to the envelope comparison signal for generating a square wave, the fundamental frequency of which square wave is half that of the envelope comparison signal. This square wave is supplied to the skew compensating device as the skew jump indication signal.

DETAILED DESCRIPTION OF THE INVENTION

Figure 7:
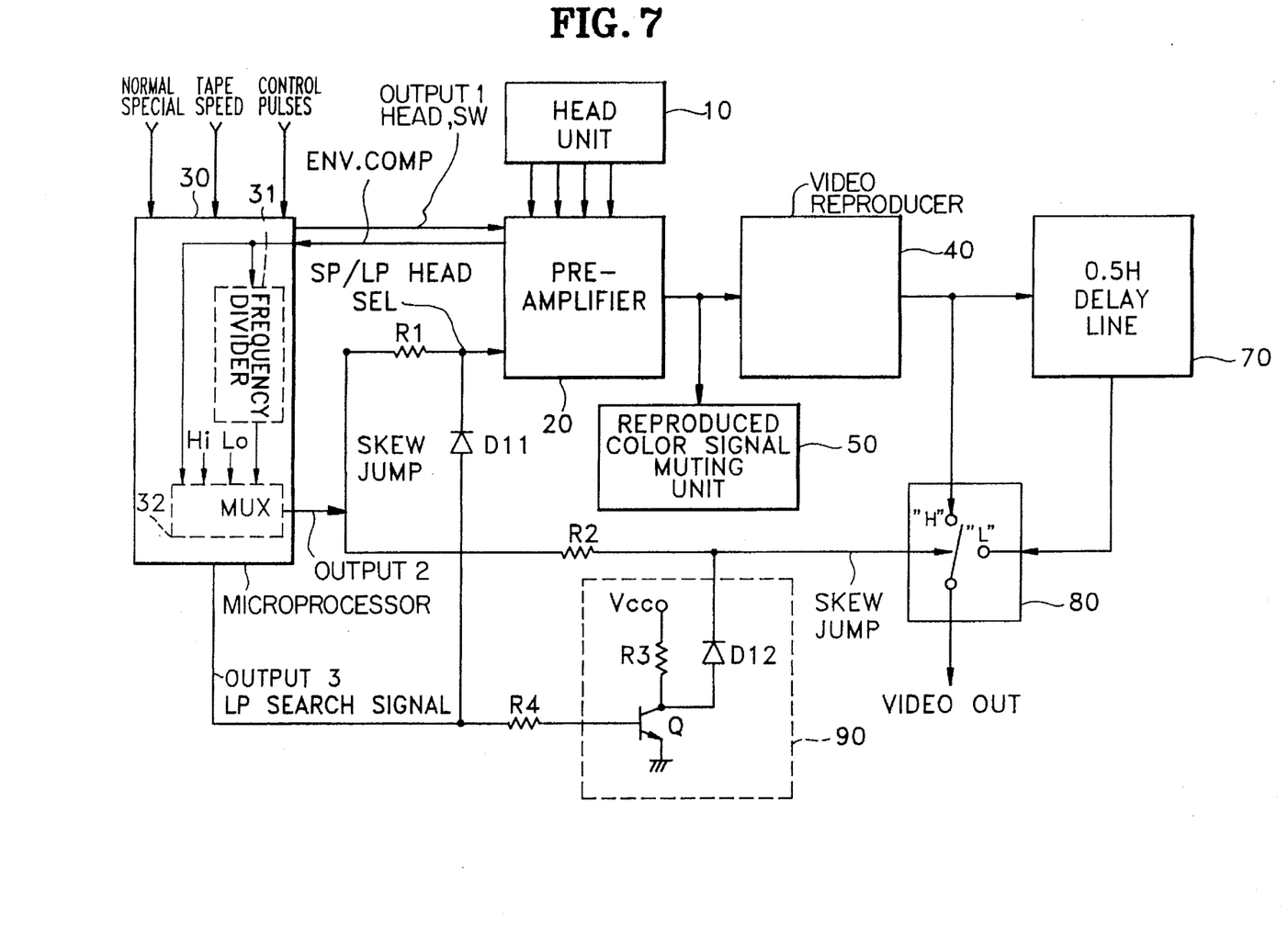
FIG. 7 is a circuit diagram of a skew compensation device for use in helical-scan video tape playback apparatus, according to one embodiment of the present invention.

FIG. 7 is a circuit diagram of a skew compensation device for use in a helical-scan video tape playback apparatus, according to one embodiment of the present invention. In FIG. 7, elements similar to those shown in FIG. 2 are denoted by the same reference designations, and details of their structure and operation will not be described again. Specifically, the head unit 10, the preamplifier 20, the video reproducer 40, the reproduced color signal muting unit 50, the delay line 70 and the output video signal selection switch 80 have the same structure and operation in both circuits. A microprocessor 30 programmed to operate somewhat differently than in the prior art, a diode D11 and a switch controller 90 are further included in the skew compensating device of FIG. 7. There is no skew jump detector included in the skew compensating device of FIG. 7. Instead the skew jump indication signal (SKEW JUMP) is generated using a frequency divider 31 to divide the frequency of the envelope compensation signal by two, as will be explained in more detail further on in this specification. FIG. 7 shows the frequency divider 31 being realized within the microprocessor 30.

The microprocessor 30 receives from the preamplifier 20 an envelope comparison signal (ENV. COMP) output generated by an envelope comparator that is not explicitly shown in FIG. 7, but corresponds to the envelope comparator 27 of FIG. 2. As in the prior-art apparatus of FIG. 2, the microprocessor 30 is programmed such that: a head switching signal (HEAD SW) as shown in FIG. 4A is generated in each of the search modes as a first output signal (OUTPUT 1) from the microprocessor 30; during the SP search mode, the microprocessor 30 supplies the envelope comparison signal to the preamplifier 20 as the SP/LP head selection signal; and, during the SLP search mode, the microprocessor 30 supplies a "high" signal to the preamplifier 20 as the SP/LP head selection signal.

In accordance with the invention, the envelope comparison signal is frequency-divided by two by a frequency divider 31 to generate a skew jump indication signal (SKEW JUMP). In alternative embodiments of the invention the frequency divider 31 can be an external, triggered (or T-type) flip-flop separate from the microprocessor 30. However, in embodiments of the invention that are preferred because of reduced element count and consequent lower cost, the frequency divider 31 is provided as an internal element within the microprocessor 30 in response to suitable programming of the microprocessor 30. The preferred embodiment of the invention depicted in FIG. 7 is designed to use the same microprocessor 30 as the prior-art apparatus of FIGS. 2 and 5, but with modified programming. This microprocessor 30 does not have an additional output terminal available for the skew jump signal generated by the frequency divider 31, posing an additional problem for solution.

The inventor discerned that the LP search signal supplied as a third output signal (OUTPUT 3) from the microprocessor 30 during the LP search mode can be used for conditioning the head amplifier switch in the preamplifier 20 to select only the signals picked up by LP– and LP+ heads and transferred through the second head selecting switch 26, rather than using the SP/LP head selection signal. This permits the output terminal through which the SP/LP head selection signal is supplied as a third output signal (OUTPUT 2) from the microprocessor 30 during the SP search mode and during the SLP search mode to be used instead during the LP search mode for supplying a skew jump indication signal generated within the microprocessor 30.

Accordingly, the frequency divider 31 within the microprocessor 30 is programmed to supply its skew jump indication signal only during the LP search mode to the output terminal through which otherwise the SP/LP head selection signal is supplied during the SP search mode and during the SLP search mode. FIG. 7 indicates this being carried out through the agency of a multiplexer 32. The multiplexer 32 selects a "low" logic condition as OUTPUT 2 of the microprocessor 30 during the SP normal play mode, selects the envelope comparison signal as OUTPUT 2 of the microprocessor 30 during the SP search mode, selects the skew jump indication signal from the frequency divider 31 as OUTPUT 3 of the microprocessor 30 during the LP search mode; and selects a "high" logic condition as OUTPUT 2 of the microprocessor 30 during the SLP search mode, the SLP normal play mode and the LP normal play mode. The microprocessor 30 is reprogrammed to supply an LP search signal in FIG. 7 that is the logic complement of the LP search signal in FIG. 5, the reader is advised. The LP search signal in FIG. 7 has a "high" level during the LP search mode and has a "low" level during the SP search mode and during the SLP search mode. The elements 31 and 32 represent functions carried out in the microprocessor 30 responsive to its programming and do not correspond to dedicated circuitry within the microprocessor 30 for performing those functions, the reader is further advised.

The OUTPUT 2 signal from the microprocessor 30 is supplied via a resistor R1 to the preamplifier 20, wherein it is selectively applied as control signal for a head amplifier switch that is not explicitly shown in FIG. 7, but corresponds to the head amplifier switch 28 of FIG. 2. An LP search signal output from the microprocessor 30 is applied to the anode of diode D11 and the cathode of diode D11 is coupled to the head amplifier switch of the preamplifier 20. The presence of the resistor R1 permits the LP search signal supplied as OUTPUT 2 signal from the microprocessor 30 being "high" to forward-bias the diode D11 into conduction and to clamp the control voltage supplied the head amplifier switch in the preamplifier 20 to that "high" level, irrespective of the state of the OUTPUT 2 signal from the microprocessor 30. Clamping the control voltage supplied the head amplifier switch in the preamplifier 20 to "high" level conditions the head amplifier switch to select the preamplifier 20 output signal only between responses from the LP heads. When the LP search signal output supplied as OUTPUT 2 signal from the microprocessor 30 is "low" during the SP search mode or during the SLP search mode, the diode D11 is reverse-biased into non-conduction; and the SP/LP head selection signal applied via a resistor R1 to the preamplifier 20 supplies the control signal for the head amplifier switch with effect similar to that in the FIG. 2 preamplifier 20 during the search modes other than the LP search mode.

The skew jump indication signal, supplied from the microprocessor 30 as its OUTPUT 2 signal during the LP search mode, is applied via a resistor R2 to the switch 80 as the control signal therefor. The presence of the resistor R2 permits the switch controller 90 to clamp the control voltage for the switch 80 to "high" level during the search modes other than the LP search mode, to prevent the application of the OUTPUT 2 signal to the switch 80 as its control signal and to condition the switch 80 to select as its selected video output signal the undelayed video output signal of the video reproducer 40. The switch controller 90 comprises a transistor Q in common-emitter-amplifier configuration and a diode D12 used during the clamping. The base electrode of the transistor Q receives the LP search signal via a resistor R4; the collector electrode of the transistor Q connects through a resistor R3 to a power supply source Vcc; and the emitter electrode of the transistor Q connects to ground. The anode of the diode D12 is connected from the collector electrode of the transistor Q, and the cathode of the diode D12 is connected to the control connection point of switch 80.

The resistor R3 has sufficiently low resistance that when the transistor Q is non-conductive between its collector and emitter electrodes forward conduction of the diode D12 clamps the control connection point of switch 80 to the "high" logic level provided by the supply potential Vcc. That is, the resistor R3 has sufficiently low resistance respective to the resistor R2 that they provide negligible resistive potential divider action, so the clamping of the control connection point of switch 80 to the "high" logic level via the resistor R3 and the diode D12 is not substantially affected by the condition of the OUTPUT 2 signal from the microprocessor 30.

The resistor R4 has sufficient resistance that saturated conduction of the transistor Q does not clamp the LP search signal from the microprocessor 30 so as to prevent it from going to the logic "high" level needed to forward-bias the diode D11 during the LP search mode. If the bipolar transistor Q is replaced by an equivalent enhancement-mode insulated-gate field effect transistor, the resistor R4 can be replaced by a wire connection since there is no clamping action at the gate electrode of the field effect transistor even when it is fully conductive. The diodes D11 and D12 are unilaterally conductive devices, of course.

The operation of the device shown in FIG. 7 will be explained also referring to FIGS. 8A, 8B & 8C and to FIG. 9. In the LP search mode, the microprocessor 30 causes the envelope comparison signal output from preamplifier 20 to be frequency divided by two by frequency divider 31 and to be supplied as a skew jump indication signal in place of the SP/LP head selection signal supplied from the same output terminal during the search modes other than the LP search mode. The frequency divider 31 is preferably arranged to be reset after every head switching to a predetermined state, to reduce the possibility of occasional skew jumps between special-reproduction modes when there is error in locating track beginnings. Resetting to the state in which the switch 80 selects the undelayed response of the video reproducer 40 as its video output signal is slightly better than resetting to other state.

Figure 8A:
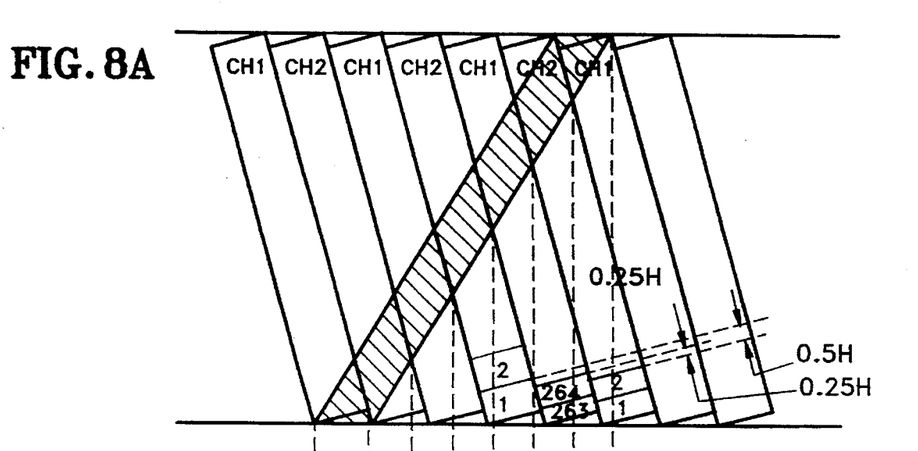
FIG. 8A is a view for explaining the scanning trace on tape when searching is performed in LP mode.
Figure 8B:
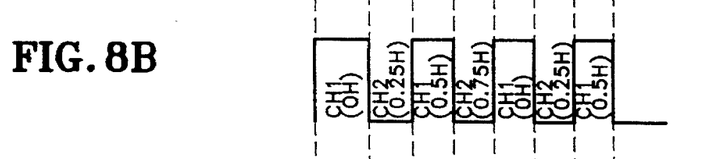
FIG. 8B is a waveform of an envelope comparison signal.

When forward searching in LP mode, the tape pattern is as shown in FIG. 8A, whichever of the two long-play heads is used for tracing the shaded path; and the envelope comparison signal output from the preamplifier 20 is as shown in FIG. 8B. The numbers in the parentheses of FIG. 8A denote the respective H mismatch. The envelope comparison signal shown in FIG. 8B is "high" when tracing across a first channel track CH1 recorded by a head having a gap at an azimuth angle similar to that of the gap of the reproducing head and is "low" when tracing across a second channel track CH2 recorded by a head having a gap at an azimuth angle differing from that of the gap of the reproducing head. When tracing across the second channel tracks CH2, the envelope comparison signal is "low". This is because pick-up by the reproducing head is reduced, owing to the azimuth angle of its gap differing from that of the head that recorded the second channel tracks CH2.

The comparison of the envelope of the signal picked up by the reproducing head to a prescribed level could be to a direct voltage rather than to the preamplified response of the one of the standard-play heads SP+, SP− selected by the head switch corresponding to 25 in FIG. 2.

Since the level of the envelope comparison signal (shown in FIG. 8B) changes every time a succeeding track is traced over by the reproducing head and a 0.25 H skew jump occurs, halving the frequency of this envelope comparison signal with the frequency divider 31 will generate a skew jump indication signal (shown in FIG. 8C) the level of which changes every alternate scan line, when a 0.5 H skew jump occurs.

Figure 9:
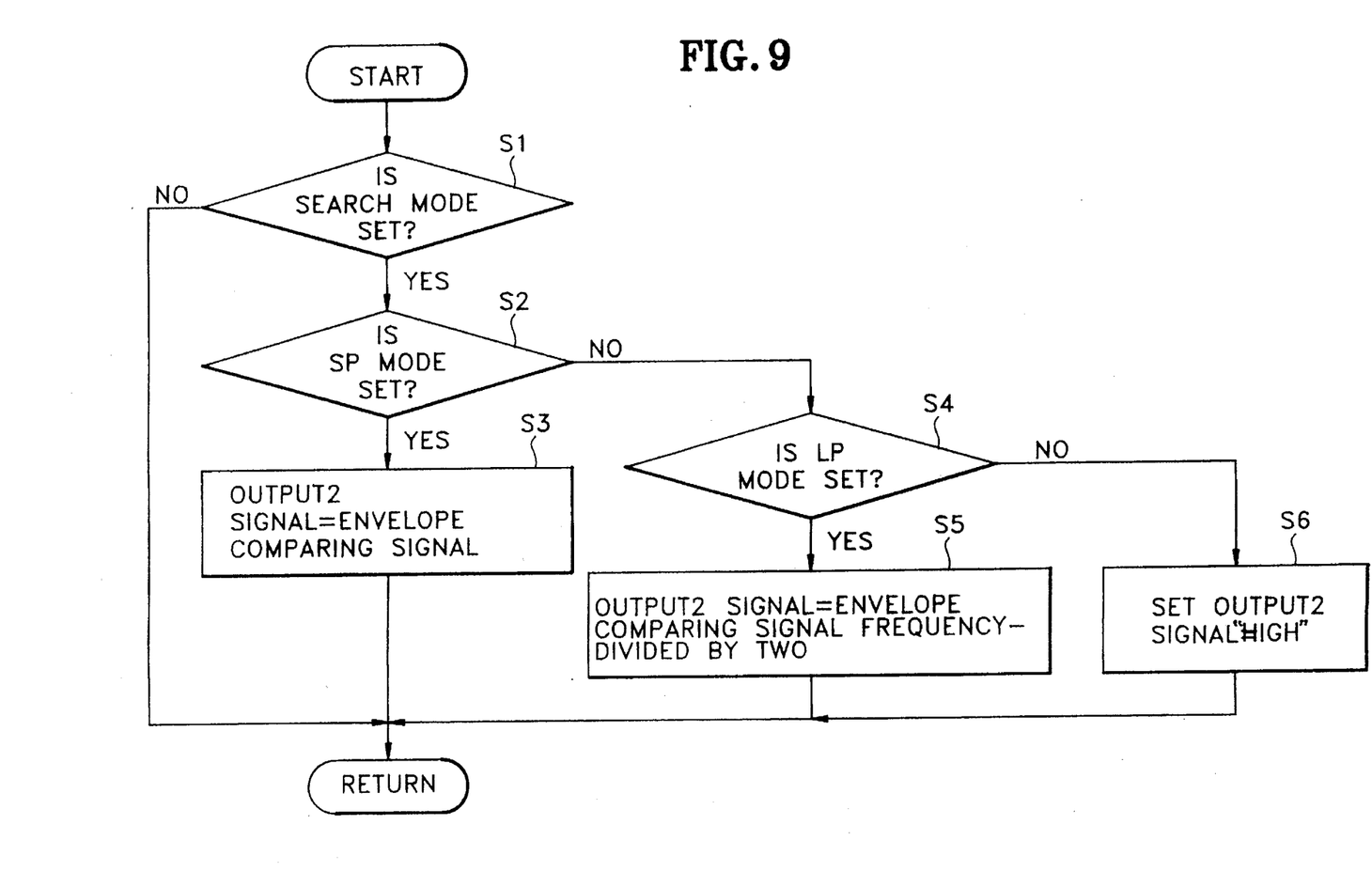
FIG. 9 is a flow chart descriptive of a program used by the FIG. 7 microprocessor for generating respective head-selecting control signals for each of the SP, LP and SLP modes.

FIG. 9 is a flow chart of the microprocessor 30 programming for controlling the fast search modes. Periodically, it is determined whether a search mode is set by a user (step S1). If not, a "return" operation is made for performing other functions.

However, if the search mode is set, a check is made as to whether the system is in the SP mode (step S2). If the system is in SP search mode, the envelope comparison signal detected in the envelope comparator (not shown in FIG. 7) is selected (step S3) to be the SP/LP head selection signal supplied as OUTPUT 2 signal from the microprocessor 30.

If the system is not in SP search mode, a check is made as to whether the system is in the LP mode (step S4). If the system is in LP search mode, the frequency divider 31 supplies the halved frequency of the envelope comparison signal as OUTPUT 2 signal (step S5) to be used as SKEW JUMP signal by the output video signal selection switch 80.

If neither the SP search mode nor the LP search mode is selected, the search mode is set to the SLP search mode, so the SP/LP head selection signal output supplied as OUTPUT 2 signal from the microprocessor 30 is always "high" (steps S3–S6).

Figure 8C:
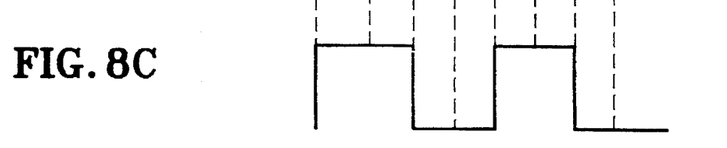
FIG. 8C is a waveform of the signal obtained by frequency-dividing the envelope comparison signal by two.

When the microprocessor 30 determines that the system is in LP search mode, the output video signal selection switch 80 supplies either the video signal output from the video reproducer 40 or a 0.5 H-delayed video signal output from the delay line 70, in accordance with the digital level of the skew jump indication signal as shown in FIG. 8C. Further, when the microprocessor 30 determines that the system is in LP search mode, although the OUTPUT 2 signal from the microprocessor 30 is equal to the envelope comparison signal frequency divided by two, the SP/LP head selection signal is not determined by this signal. The SP/LP head selection signal which is actually applied to the head amplifier switch (not shown) in the preamplifier 20 is a "high" state of LP search signal supplied as OUTPUT 3 signal from the microprocessor 30. This logic "high" signal is applied through the diode D11 to the head amplifier switch (not shown), so that the LP head is selected by the head amplifier switch (not shown).

Since a skew does not occur when in SP and SLP search modes, the skew jump indication signal supplied to the switch 80 as control signal should be continually "high" for these search modes, to condition the switch 80 for continually selecting the undelayed video signal of video reproducer 40 as video output signal. The switch controller 90 provides for the skew jump indication signal to be continually "high" during the SP and SLP search modes, thereby preventing the switch 80 from selecting the 0.5 H-delayed signal supplied by the delay line 70. Except when in the LP search mode, the LP search signal is "low." When this "low" state signal is supplied to the base of the transistor Q, the transistor Q is turned off, so that there is substantially no conduction from its collector to its emitter. This allows the power supply voltage (for example, +5 V which is a logic "high") to be applied through diode D12 to switch 80 as a control signal. Accordingly, switch 80 selects the reproduced signal from the video reproducer 40 as the output video signal.

The resistor R2 provides sufficient resistance that the SP/LP head selection signal output node of the microprocessor 30 is not clamped to the power supply voltage by the diode D12 being forward-biased at this time. Accordingly, the OUTPUT 2 signal from the microprocessor 30 can still supply the envelope comparison signal as SP/LP head selection signal output when the system is in the SP search mode.

As described above, the present invention uses the signal obtained by dividing the frequency of an envelope comparison signal by two as a skew jump indication signal, so that a 0.5 H-delayed video signal is output when a 0.5 H skew jump occurs and a skew generated when special reproducing in LP mode is compensated. Accordingly, skew compensation is achieved by a simple circuit configuration without having to have a complex separate circuit for generating the skew jump indication signal.

The inventions described above and claimed below have application in NTSC, PAL, and SECAM type helical-scan video tape playback apparatuses having SP, LP and SLP modes.

What is claimed is:

1. A method of playing back from a magnetic tape to obtain a reproduced video signal from a recording made on a magnetic video tape with a predetermined helical-scan pattern, said method practiced using a tape transport operable at normal and faster-than-normal reproduction speeds and having a head drum with diametrically opposed first and second heads mounted on its rim, which said first and second heads have respective windings, said method comprising the steps of:

transporting said magnetic tape at said faster than normal reproduction speed past said head drum being rotated at a prescribed speed, thereby inducing signals in the respective windings of said first and second heads;

pre-amplifying signals induced in the respective windings of said first and second heads to generate first and second pre-amplified signals;

alternately selecting from said first and second pre-amplified signals to supply a selected pre-amplified signal;

reproducing a first video signal from said selected pre-amplified signal;

delaying said first video signal by the time duration of substantially one half a horizontal scan line to generate a second video signal;

comparing an envelope of said selected pre-amplified signal to a prescribed level, for generating an envelope comparison signal having a fundamental frequency;

frequency dividing said envelope comparison signal for generating a skew jump indication signal that alternates between first and second conditions, said skew jump indication signal being essentially a square-wave having half the fundamental frequency of said envelope comparison signal;

selecting said first video signal as said reproduced video signal responsive to the first condition of said skew jump indication signal; and selecting said second video signal as said reproduced video signal responsive to the second condition of said skew jump indication signal.

2. A method of playing back from a magnetic tape, as set forth in claim 1, usable when said head drum of said tape transport has diametrically opposed third and fourth heads also mounted on its said rim, which said third and fourth heads have respective windings, said method further comprising the steps of:

pre-amplifying signals induced in the respective windings of said third and fourth heads to generate third and fourth pre-amplified signals;

alternately selecting from said third and fourth pre-amplified signals to supply said prescribed level for said step of comparing an envelope of said selected pre-amplified signal thereto.

3. Helical-scan video tape playback apparatus being operable in a standard-play mode both at normal-reproduction and special-reproduction speeds; being operable in a long-play mode both at normal-reproduction and special-reproduction speeds; having a head drum with first and second standard-play heads mounted on opposite sides of a rim thereof and with first and second long-play heads mounted on the opposite sides of said rim thereof; having preamplifier circuitry for preamplifying respective pickup signals from each of said heads and selecting as a preamplifier output signal one of respective preamplified pickup signals thereby resulting; having video reproducing circuitry for generating a first video signal in response to said preamplifier output signal; having a delay line for supplying a second video signal in delayed response to said first video signal; having circuitry for generating a skew jump indication signal having first or second condition responsive to the passage of one of said pair of long play heads over alternate recording tracks during special reproduction from video tape recorded in the long play mode; having a skew compensating device for supplying a third video signal responsive to said first video signal when the first condition of said skew jump indication signal obtains and responsive to said second video signal when the second condition of said skew jump indication signal obtains, skewing appearing in said first and second video signals in response to scanning across alternate recording tracks with staggered horizontal scan lines therein accordingly being compensated for in said third video signal; and being improved in that said means for generating said skew jump indication signal comprises:

a comparator for comparing the envelope of a selected one of the respective preamplified pickup signals from said pair of long-play heads with a prescribed level for generating an envelope comparison signal;

a frequency divider responsive to said envelope comparison signal for generating a square wave the fundamental frequency of which is half that of said envelope comparison signal; and     circuitry for selectively applying said square wave to said skew compensating device as said skew jump indication signal during special reproduction from video tape recorded in the long play mode.

4. An improved helical-scan video tape playback apparatus as set forth in claim 3, further comprising:

switch control circuitry for generating a head switch signal and a standard-play/long-play head selection signal, said head switch signal having alternate first and second conditions, said first condition of said head switch signal being indicative that playback is to be from one of said first standard-play head and said first long-play head, and said second condition of said head switch signal being indicative that playback is to be from one of said second standard-play head and said second long-play head, said switch control circuitry selectively generating standard-play/long-play head selection signal that has a value associated with standard-play head selection when said video tape playback apparatus is operated in said standard-play mode at said normal-reproduction speed, said switch control circuitry selectively generating standard-play/long-play head selection signal that has a value associated with long-play head selection when said video tape playback apparatus is operated in said long-play mode at said normal-reproduction speed or at said special-reproduction speed, and said switch control circuitry selectively generating standard-play/long-play head selection signal responsive to said envelope comparison signal, so as to alternate between said values associated with standard-play head selection and with long-play head selection, when said video tape playback apparatus is operated in said standard-play mode at said special-reproduction speed.

5. An improved helical-scan video tape playback apparatus as set forth in claim 4 wherein said preamplifier circuitry for selecting one of respective preamplified pickup signals from said heads comprises said comparator and further comprises:

a first head switch, responding to said first condition of said head switch signal for selecting preamplified pickup signal from a first of said pair of standard-play heads for application to said comparator as said prescribed level, and responding to said second condition of said head switch signal for selecting preamplified pickup signal from a second of said pair of standard-play heads for application to said comparator as said prescribed level;

a second head switch, responding to said first condition of said head switch signal for selecting preamplified pickup signal from a first of said pair of long-play heads for application to said comparator as said selected one of the respective preamplified pickup signals from said pair of long-play heads, and responding to said second condition of said head switch signal for selecting preamplified pickup signal from a second of said pair of long-play heads for application to said comparator as said selected one of the respective preamplified pickup signals from said pair of long-play heads; and     a head amplifier switch controlled by a currently generated said standard-play/long-play head selection signal for selecting, as said preamplifier output signal, the preamplified pickup signal selected by said first head switch from said pair of standard-play heads when said comparator furnishes indication that the envelope of a selected one of the respective preamplified pickup signals from said pair of long-play heads is below said prescribed level, or the preamplified pickup signal selected by said second head switch from said pair of long-play heads when said comparator furnishes indication that the envelope of a selected one of the respective preamplified pickup signals from said pair of long-play heads is above said prescribed level.

6. An improved helical-scan video tape playback apparatus as set forth in claim 4, being operable in a super-long-play mode both at normal-reproduction and special-reproduction speeds, wherein said circuitry for generating a standard-play/long-play head selection signal selectively generates standard-play/long-play head selection signal that has a value for long-play head selection when said video tape playback apparatus is operated in said super-long-play mode at said normal-reproduction speed or at said special-reproduction speed.

7. An improved helical-scan video tape playback apparatus as set forth in claim 6 wherein said preamplifier circuitry for selecting one of respective preamplified pickup signals from said heads comprises said comparator and further comprises:

a first head switch, responding to said first condition of said head switch signal for selecting preamplified pickup signal from a first of said pair of standard-play heads for application to said comparator as said prescribed level, and responding to said second condition of said head switch signal for selecting preamplified pickup signal from a second of said pair of standard-play heads for application to said comparator as said prescribed level;

a second head switch, responding to said first condition of said head switch signal for selecting preamplified pickup signal from a first of said pair of long-play heads for application to said comparator as said selected one of the respective preamplified pickup signals from said pair of long-play heads, and responding to said second condition of said head switch signal for selecting preamplified pickup signal from a second of said pair of long-play heads for application to said comparator as said selected one of the respective preamplified pickup signals from said pair of long-play heads; and     a head amplifier switch controlled by a currently generated said standard-play/long-play head selection signal for selecting, as said preamplifier output signal, the preamplified pickup signal selected by said first head switch from said pair of standard-play heads when said comparator furnishes indication that the envelope of a selected one of the respective preamplified pickup signals from said pair of long-play heads is below said prescribed level, or the preamplified pickup signal selected by said second head switch from said pair of long-play heads when said comparator furnishes indication that the envelope of a selected one of the respective preamplified pickup signals from said pair of long-play heads is above said prescribed level.

8. An improved helical-scan video tape playback apparatus as set forth in claim 3, including a microprocessor connected to receive said envelope comparison signal and indications of the speed at which a video tape being played back was recorded and of playback speed being a normal-reproduction speed or a higher-than-normal special-reproduction speed; said microprocessor being programmed to provide, during long-play mode at special-reproduction speed, said frequency divider for generating a square wave the fundamental frequency of which is half that of said envelope comparison signal.

9. An improved helical-scan video tape playback apparatus as set forth in claim 8, wherein said microprocessor provides a source of head switch signal having alternate first and second conditions and is included in said circuitry for generating a standard-play/long-play head selection signal.

10. Helical-scan video tape playback apparatus being operable in a standard-play mode both at normal-reproduction and special-reproduction speeds; being operable in a long-play mode both at normal-reproduction and special-reproduction speeds; and having:

a pair of standard-play heads and a pair of long-play heads mounted on a head drum thereof;

a microprocessor connected to receive an envelope comparison signal, connected to receive indications of playback speed being a normal-reproduction speed or a higher-than-normal special-reproduction speed and to receive indications of the speed at which a video tape being played back was recorded, programmed to supply a head switching signal from a first output terminal thereof, programmed to supply a "low" logic level from a second output terminal thereof during standard play mode at normal-reproduction speed, programmed to supply a "high" logic level from said second output terminal thereof during long play mode at normal-reproduction speed, and programmed to supply a "high" logic level from a third output terminal thereof during long play mode at higher-than-normal special-reproduction speed;

preamplifier circuitry for preamplifying respective pickup signals from each of said heads;

a first head switch included within said preamplifier circuitry, said first head switch responding to said first condition of said head switch signal for selecting preamplified pickup signal from a first of said pair of standard-play heads as first headswitch output signal, said first head switch responding to said second condition of said head switch signal for selecting preamplified pickup signal from a second of said pair of standard-play heads as said first headswitch output signal;

a second head switch included within said preamplifier circuitry, said second head switch responding to said first condition of said head switch signal for selecting preamplified pickup signal from a first of said pair of long-play heads as second headswitch output signal circuitry, said second head switch responding to said second condition of said head switch signal for selecting preamplified pickup signal from a second of said pair of long-play heads as second headswitch output signal;

a head amplifier switch included within said preamplifier circuitry, said head amplifier switch responsive to a control signal therefor being a logic "low" signal for selecting said first head switch output signal as a preamplifier output signal, said head amplifier switch responsive to a control signal therefor being a logic "high" signal for selecting said second head switch output signal as a preamplifier output signal;

a comparator for comparing the envelope of said second headswitch output signal with the envelope of said first headswitch output signal for generating said envelope comparison signal received by said microprocessor, said microprocessor being programmed to supply from a second output terminal thereof during standard play mode at special-reproduction speed either a "low" logic level responsive to the envelope of said first headswitch output signal exceeding the envelope of said second headswitch output signal or a "high" logic level responsive to the envelope of said second headswitch output signal exceeding the envelope of said first headswitch output signal;

video reproducing circuitry for generating a first video signal in response to said preamplifier output signal;

a delay line for supplying a second video signal in delayed response to said first video signal;

circuitry for generating a skew jump indication signal having first or second condition responsive to the passage of one of said pair of long play heads over alternate recording tracks during special reproduction from video tape recorded in the long play mode;

an output video signal selection switch controlled by said skew jump indication signal for supplying a third video signal, said third video signal being responsive to said first video signal when the first condition of said skew jump indication signal obtains and being responsive to said second video signal when the second condition of said skew jump indication signal obtains; and an improvement wherein said means for generating said skew jump indication signal comprises:

said comparator for comparing the envelope of said second headswitch output signal with the envelope of said first headswitch output signal for generating an envelope comparison signal, said microprocessor being programmed to respond to said envelope comparison signal for supplying from its said second output terminal during said long-play mode at special-reproduction speed a square wave the fundamental frequency of which is half that of said envelope comparison signal; and circuitry for selectively applying said square wave to said output video signal selection switch as said skew jump indication signal during special reproduction from video tape recorded in the long play mode.

11. An improved helical-scan video tape playback apparatus as set forth in claim 10 having a first node at which the control signal for said head amplifier switch is applied by:

a first resistor connecting from said second output terminal of said microprocessor to said first node, and a first unilaterally conductive device for applying to said first node the "high" logic level supplied from said third output terminal of said microprocessor during long play mode at higher-than-normal special-reproduction.

12. An improved helical-scan video tape playback apparatus as set forth in claim 11 having a second node to which said square wave that is the control signal for said output video signal selection switch is applied by:

a second resistor connecting from said second output terminal of said microprocessor to said second node;

a transistor having a collector electrode, having an emitter electrode connected to a point at said "low" logic level, and having a base electrode to which the "high" logic level supplied from said third output terminal of said microprocessor during long play mode at higher-than-normal special-reproduction speed is applied for selectively rendering said transistor conductive between its collector and emitter electrodes;

a third resistor connecting from a point at said "high" logic level to the collector electrode of said transistor; and a second unilaterally conductive device for applying to said second node the "high" logic level appearing at the collector electrode of said transistor when said transistor is not conductive between its collector and emitter electrodes.

13. A helical-scan video tape playback apparatus being operable in a standard-play mode both at normal-reproduction and special-reproduction speeds; being operable in a long-play mode both at normal-reproduction and special-reproduction speeds; and having:

a pair of standard-play heads and a pair of long-play heads mounted on a head drum thereof;

a microprocessor connected to receive an envelope comparison signal, connected to receive indications of playback speed being a normal-reproduction speed or a higher-than-normal special-reproduction speed and to receive indications of the speed at which a video tape being played back was recorded, programmed to supply a head switching signal from a first output terminal thereof, programmed to supply a "low" logic level from a second output terminal thereof during standard play mode at normal-reproduction speed, programmed to supply a "high" logic level from said second output terminal thereof during long play mode at normal-reproduction speed, and programmed to supply a "high" logic level from a third output terminal thereof during long play mode at higher-than-normal special-reproduction speed;

preamplifier circuitry for preamplifying respective pickup signals from each of said heads;

a first head switch included within said preamplifier circuitry, said first head switch responding to said first condition of said head switch signal for selecting preamplified pickup signal from a first of said pair of standard-play heads as first headswitch output signal, said first head switch responding to said second condition of said head switch signal for selecting preamplified pickup signal from a second of said pair of standard-play heads as said first headswitch output signal;

a second head switch included within said preamplifier circuitry, said second head switch responding to said first condition of said head switch signal for selecting preamplified pickup signal from a first of said pair of long-play heads as second headswitch output signal circuitry, said second head switch responding to said second condition of said head switch signal for selecting preamplified pickup signal from a second of said pair of long-play heads as second headswitch output signal;

a head amplifier switch included within said preamplifier circuitry, said head amplifier switch responsive to a control signal therefor being a logic "low" signal for selecting said first head switch output signal as a preamplifier output signal, said head amplifier switch responsive to a control signal therefor being a logic "high" signal for selecting said second head switch output signal as a preamplifier output signal;

a comparator for comparing the envelope of said second headswitch output signal with the envelope of said first headswitch output signal for generating said envelope comparison signal received by said microprocessor, said microprocessor being programmed to supply from a second output terminal thereof during standard play mode at special-reproduction speed either a "low" logic level responsive to the envelope of said first headswitch output signal exceeding the envelope of said second headswitch output signal or a "high" logic level responsive to the envelope of said second headswitch output signal exceeding the envelope of said first headswitch output signal;

video reproducing circuitry for generating a first video signal in response to said preamplifier output signal;

a delay line for supplying a second video signal in delayed response to said first video signal;

circuitry for generating a skew jump indication signal having first or second condition responsive to the passage of one of said pair of long play heads over alternate recording tracks during special reproduction from video tape recorded in the long play mode;

an output video signal selection switch controlled by said skew jump indication signal for supplying a third video signal, said third video signal being responsive to said first video signal when the first condition of said skew jump indication signal obtains and being responsive to said second video signal when the second condition of said skew jump indication signal obtains; and a first node at which the control signal for said head amplifier switch is applied by:

a first resistor connecting from said second output terminal of said microprocessor to said first node, and a first unilaterally conductive device for applying to said first node the "high" logic level supplied from said third output terminal of said microprocessor during long play mode at higher-than-normal special-reproduction.

14. An improved helical-scan video tape playback apparatus as set forth in claim 13 having a second node to which said square wave that is the control signal for said output video signal selection switch is applied by:

a second resistor connecting from said second output terminal of said microprocessor to said second node;

a transistor having a collector electrode, having an emitter electrode connected to a point at said "low" logic level, and having a base electrode to which the "high" logic level supplied from said third output terminal of said microprocessor during long play mode at higher-than-normal special-reproduction speed is applied for selectively rendering said transistor conductive between its collector and emitter electrodes;

a third resistor connecting from a point at said "high" logic level to the collector electrode of said transistor; and a second unilaterally conductive device for applying to said second node the "high" logic level appearing at the collector electrode of said transistor when said transistor is not conductive between its collector and emitter electrodes.

* * * * *